May 16, 1933.  O. F. BAUER  1,909,088
GEAR TESTING MACHINE
Filed Nov. 26, 1930  5 Sheets-Sheet 1

Fig. 1

INVENTOR
Oliver F. Bauer
BY
his ATTORNEY

May 16, 1933.  O. F. BAUER  1,909,088
GEAR TESTING MACHINE
Filed Nov. 26, 1930  5 Sheets-Sheet 3

INVENTOR
Oliver F. Bauer
BY Schlesinger
his ATTORNEY

INVENTOR
Oliver F. Bauer
BY Schlesinger
his ATTORNEY

Patented May 16, 1933

1,909,088

UNITED STATES PATENT OFFICE

OLIVER F. BAUER, OF ROCHESTER, NEW YORK, ASSIGNOR TO GLEASON WORKS, OF ROCHESTER, NEW YORK, A CORPORATION OF NEW YORK

GEAR TESTING MACHINE

Application filed November 26, 1930. Serial No. 499,573.

The present invention relates to machines for testing gears in a running test.

The purpose of this invention is to provide a testing machine which will be truly universal in character, a machine on which gears of all kinds can be given a running test either under load or without load. In this machine, spur gears, helical gears, internal gears, worm gears, bevel gears and hypoid gears can all be tested. This one machine will do the work for which a number of different types of testing machines are now required and for a shop that has a wide variety of gear work, a great saving in machine investment is made possible.

In the drawings:

Figure 1 shows the gears out of meshing or testing position, while Figure 2 shows the gears in mesh ready for testing;

Figures 13 to 22 inclusive are views illustrating diagrammatically the capacity of the machine for testing gears of all different kinds.

A running test of a pair of gears has many advantages. It enables the manufacturer to determine, prior to assembly, the amount and location of the tooth bearing; it enables him to test the gears without load and under load to determine, prior to assembly, their quietness under varying conditions; and it enables him to determine, prior to assembly, the amount of adjustment that the gears have, and, therefore, their suitability for use in assemblies where variations in mountings and loads are likely to occur. A running test on the new universal machine of the present invention is made in the same general way as a running test has been made on the single-purpose gear testing machines heretofore built. The pair of gears to be tested are secured on the drive and driven spindles of the machine and are run together in mesh, one gear being driven from the other. A manually operated brake is provided which operates on the driven spindle and through this brake a load can be applied to the gears to effect a load test.

Referring to the drawings by numerals of reference, 30 indicates the base or frame of the machine. The frame is formed on its upper face with ways 31, 31 and ways 32, 32. The ways 31, 31 extend at right angles to the ways 32, 32 and the frame is so formed, also, that the upper faces of the ways 31, 31 lie in a different horizontal plane from the upper faces of the ways 32, 32. This construction is clearly shown in Figure 3.

Mounted on the frame 30 for sliding adjustment on the ways 31, 31 is a slide or plate 34. The adjustment of the plate or slide 34 upon the ways 31 is effected by rotation of a handwheel 36. This handwheel is secured to a shaft 37 which is suitably journaled in a bracket 38 that is secured in any suitable manner to the slide 34. The shaft 37 carries at its inner end a bevel gear 39 which meshes with the bevel gear 40 that is secured to a screw-shaft 41. The screw-shaft 41 is journaled at one end in a bearing 42 that is formed integral with the slide 34. At its other end, the screw shaft 41 threads into a nut 43 which is secured by screws 44 to the frame 30.

It will be seen that when the handwheel 36 is rotated, the slide 34 will be adjusted upon the ways 31 of the frame. The slide 34 is held on the ways 31, 31 by gibs 45, 45. These gibs 45, 45 are secured to the slide 34 by screws 46. The screws exert no clamping tension on the gibs 45, 45 but serve simply to hold the gibs to the ways so that there is a sliding fit beween the ways 31 and the gibs. The slide 34 is clamped in any adjusted position by a bolt 48 which passes through one of the gibs at one end thereof and threads into the slide 34. When this bolt is tightened up, the gib 45 is sprung enough to clamp the slide 34 in its adjusted position. The bolt 48 is manipulated by the hand lever 49. Wear of the ways 31 can be compensated for by adjustment of the taper gib 50 which is adjustably secured to the slide 34 by the adjusting screws 51. This is a usual construction.

Figures 2, 10, 11:
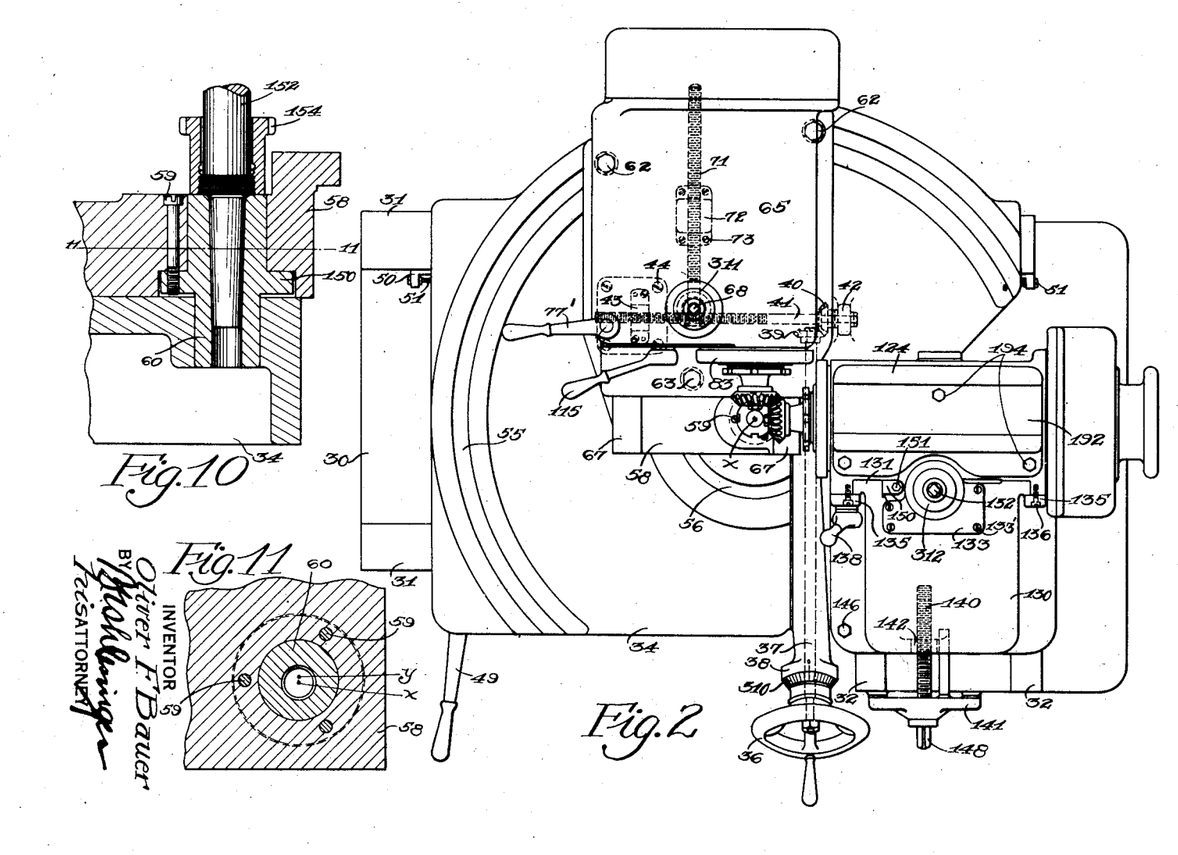
Figure 10 is a fragmentary sectional view illustrating the means which is provided to permit lining up the axis of the driven spindle of the machine with the center about which the swinging base that carries the driven head is adjustable.
Figure 11 is a sectional view taken on the line 11—11 of Figure 10.

The slide 34 has a pair of arcuate T-slots 55 and 56 formed in its upper face. These slots are curved about a common center indicated by the letter X. The slide 34 carries a swinging base 58. There is an opening through the swinging base and in this opening there is fastened by screws 59 a sleeve 60, (Figures 10 and 11). The sleeve 60 fits into a cylindrical opening in the slide 34 and serves as a bearing or trunnion on which the swinging base 58 is swung for angular adjustment on the slide 34. The axis of the sleeve or trunnion 60 is the axis X already referred to and so the angular adjustment of the base 58 on the slide 34 is an adjustment about this axis X. The base 58 can be secured in any adjusted position on the slide 34 by T-bolts 62 and 63 which engage in the T-slots 55 and 56 of the slide 34, respectively.

The driven head 65 of the machine is mounted on the swinging base 58 for sliding adjustment thereon. The swinging base 58 is provided with straight ways 67, 67, (Figures 1, 2, 3 and 4), and the driven head 65 slides on these ways in its adjustment. The adjustment of the driven head on the ways 67 is effected by rotation of a vertical shaft 68 which is suitably journaled in the driven head 65. This shaft 68 carries at its lower end a bevel gear 69 which meshes with a bevel gear 70 that is secured to a screw-shaft 71. The shaft 71 is journaled at one end in the head 65 and threads at its other end into a nut 72 which is secured by screws 73 to the swinging base 58. The driven head 65 is held on the ways 67 by gibs 74. The gibs 74 are secured to the head 65 by screws 75 in such way as to allow a sliding fit between the gib and the ways. The head 65 can be clamped to the sliding base in any adjusted position by threading up on the bolt 77. The bolt 77 passes through the head 65 and through one end of one of the gibs 74. The head 78 of the bolt engages under the gib through which the bolt passes. The bolt carries a nut 76 at its upper end and a hand lever 77' is provided for manipulating this nut. When the nut is threaded up, the gib 74 is tightened to securely clamp the head 65 in any adjusted position on the ways 67 of the swinging base 58. A taper gib is provided, as indicated at 79 in Figure 4, to take up wear and this gib is adjustable by a screw indicated at 79'.

The driven spindle 80 of the machine is journaled on suitable anti-friction bearings 81 and 82 in the head 65. Labyrinth seals 83 and 84 or any suitable construction are provided to protect the front and rear bearings and prevent grit or dirt from getting into them. The driven gear of the pair to be tested is secured to the driven spindle 80 and the gear chucking mechanism may be of any suitable character.

A brake-drum 85 is keyed to the spindle 80 at its rear end and this brake-drum is held against axial movement on the spindle by a nut 86 which threads on the spindle and holds the drum against the rear labyrinth seal 84. There are a pair of brake arms 88 and 89 which are adapted to engage the brake-drum 85 to apply a braking load to the driven spindle. These arms are lined with a suitable braking material. The arms are pivotally mounted upon a pin 90 which is mounted in ears 91 of a lug 92 which is secured by screws 93 to a plate 94 that is in turn secured by screws 95 to the head casting 65.

The brake arms 88 and 89 are connected at their free ends by a bolt 96. The bolt 96 is secured to the brake arms by nuts 97 and a washer 98. The bolt passes through openings in the arms 88 and 89 and an opening in the ear 99 of a plate 100 that is secured by screws 101 to the plate 94. The ear 99 is interposed between the free ends of the brake arms and coil springs 102 and 103 are interposed between the ear and the two brake arms.

There is a pin 105 pivotally mounted in the head of the bolt 96. A sector 107, which is formed with two ears or furcations which straddle the bolt 96, is secured to the pin by a set-screw 108 which passes through one of its ears. The ears of the sector are flattened off to provide flat faces designated at 109 in Figure 4, and these flat surfaces engage the external face of the free end of the brake arm 89.

The sector 107 meshes with a second sector 110 that is keyed to a shaft 111. The shaft 111 is journaled in the head 65 and extends in a direction parallel to the driven spindle 80. The shaft 111 and pin 105 are held at a definite center distance by a sleeve member 112 that is rotatably mounted on the shaft 111 and is furcated to provide ears 113 which engage the pin 105. An actuating lever 115 is secured to the shaft 111 by a set-screw 116. This lever extends exteriorly of the head 65 in position to be manipulated by the operator of the machine. When the lever 115 is rocked in the direction of the arrow shown in Figure 4, a brake load will be applied to the spindle 80, for rotation of the lever 115 in the direction of the arrow will cause the segment 110 to rock the segment 107 to cause the flat surfaces 109 of the ears of the segment 107 to cam the free end of the brake arms together against the resistance of the springs 102 and 103.

The brake is normally held in released position by the spring 117 which is connected at one end to a pin 118 that is secured in the segment 110. At its other end the spring 117 is connected to a pin 119 that is secured in the plate 94.

The drive spindle 120 of the machine is journaled in suitable anti-friction bearings 121 and 122 in the drive head 124. Labyrinth seals 126 and 127 of any suitable construction are provided to protect the bearings 121 and 122 against entering of dirt or grit therein. The drive gear of the pair to be tested is secured by any suitable type of chuck to the drive spindle 120.

The drive head 124 is mounted for sliding adjustment on a vertical column or upright 130. The head slides vertically upon ways 131 formed on the column. The adjustment of the head 124 is effected by rotation of a screw shaft 132 which is suitably journaled at its upper end in a bearing bracket 133 that is secured by screws 133' to the column 130 (Fig. 2). At its lower end, the shaft 132 threads into a nut 134 that is secured to the head.

The head 124 is held on the ways 131 by gibs 135. These gibs 135 are secured to the heads by screws 136 in such manner that a sliding fit is provided between the gibs and the ways 131. The head 124 can be clamped in any position of its vertical adjustment on the column by threading up the clamping bolt 137. This bolt passes through one of the gibs 135 at one end thereof and threads into the head 124. It can be tightened by manipulating the hand-lever 138.

The column 130 is mounted for sliding adjustment on the frame of the machine. It slides in its adjustment on the ways 32 of the frame. The adjustment of the column is effected by rotation of a screw-shaft 140 that is journaled at its outer end in a bracket 141 which is secured in any suitable manner to the frame of the machine. At its inner end the screw shaft threads into a nut 142 which is secured in any suitable manner to the column.

The column is held on the ways 32 by gibs 144. These gibs are secured to the column by screws 145 to provide a sliding fit between the gibs and the ways 32. The column can be clamped in any adjusted position on the frame by tightening up on the bolt 146. The action of this bolt is similar to that of the clamping bolts employed for tightening up the gibs on other adjustable parts of the machine. The one wrench or hand-lever 138 can be employed to tighten up the bolts 137 and 146. A taper gib 148 which can be adjusted by a screw 149 (Fig. 3) is provided to take up wear on the ways 32 while a taper gib 150 which can be adjusted by a screw 151 (Fig. 2) is provided to take up wear on the ways 131.

In assembling the parts of the machine together initially, it is necessary to line up the driven spindle 80 with the trunnion bearing 60 (Figs. 10 and 11) so that the axis X of this bearing intersects the axis of the spindle 80. This is necessary because the machine will be employed in the testing of bevel gears and the axis about which the head 65 is adjusted should intersect the axis of any bevel gear to be tested which is mounted on the spindle 80. This lining-up of the spindle 80 can be done very readily by an ingenious arrangement which, so far as known, is novel with this machine. The sleeve or bearing member 60 is formed with a shoulder 150 that fits into a recess in the swinging base 58. The periphery of the sleeve below the shoulder 150 is turned concentric with the bore of the sleeve. The periphery of the sleeve above the shoulder 150 is turned eccentrically of the bore of the sleeve. The axis of the bore of the sleeve is designated at X in Figure 11 while the axis with which the upper portion of the periphery of the sleeve is coaxial is designated at Y. In assembling, the base 58 is placed upon the slide 34 and the work head 65 upon the base 58. At this time, the sleeve 60 is free to rotate for the screws 59 are not in position. To line up the axis of the spindle 80 with the axis X of the sleeve 60 a pin 152 is inserted in the bore of the sleeve 60. This pin is tapered at its lower end to conform to the taper of the bore of the sleeve. A gauge can be inserted in the bore of the spindle 80 and by taking readings of this gauge against the periphery of the pin 152, the workman who is assembling the machine can determine whether the axis of the spindle 80 intersects the axis X of the sleeve. If it does not, he can rotate the sleeve 60 until the axis of the spindle 80 does intersect the axis X. Rotation of the sleeve 60 shifts the swinging base 68 on the slide 34 by reason of the eccentricity of the upper portion of the periphery of the sleeve 60. When the axis of the spindle 80 has been lined up with the axis X the sleeve is secured to the base 58 by the screws 59 and it remains fixed in its adjusted position for the life of the machine. The taper pin 152 can be removed from the bore of the sleeve 60 by threading up on the stripper nut 154 which is threaded onto this pin 152.

From the preceding description it will be clear that the column 130 is adjustable on the frame 30 in a direction at right angles to the direction of adjustment of the slide 34 on the frame, that the swinging base 58 is adjustable angularly on the slide 34 about an axis X, that the driven head 65 is adjustable on the swinging base 58 to move the driven spindle 80 in a direction radial of the axis X and that the drive head 124 is adjustable on the column 130 in a vertical direction to bring the axis of the drive spindle 120 into the same plane with the axis of the driven spindle 80 or to offset the axis of the drive spindle above or below the axis of the driven spindle.

In the operation of the machine the pair of gears to be tested are secured to the spindles 120 and 80, respectively, and they are rotated together, one being driven from the other. The drive spindle 120 is rotated from the motor 160 through the pulley 161, which is connected to the armature shaft of the motor, the belt 162, and the pulley 163 which is keyed to the drive shaft 120. The pulley 163 is secured against axial movement on the spindle 120 by a nut 164 which threads onto the spindle. A belt-guard 165 is provided which is secured to the head 124 by screws 166. The motor 160 is mounted on a swinging base 168 that is pivoted at 169 on a bracket 170 which is secured by screws 171 to the frame of the machine. The base 168 can be adjusted in accordance with the position of vertical adjustment of the drive head 124 by a screw 172 that journaled in the bracket 170 and threads into a nut 173 which is secured to the base 168. The screw 172 is normally held against rotation by a locking pin 175 which slides in a recess in the face of the bracket 170 and is normally pressed into locking position by a spring 176 also housed in this recess. The pin 175 has a round periphery that engages in a similarly shaped kerf in the periphery of the head 178 of the screw 172, thus locking the screw against rotation. The head of the pin 175 is provided, also, with a finger 177 which extends beyond the collar 178 of the screw 172, in position to be engaged by the wrench when an operator starts to put a wrench on the square head of the screw. Thus, the same movement which engages the wrench with the head of the screw also releases the locking pin 175.

Figures 3, 8, 9:
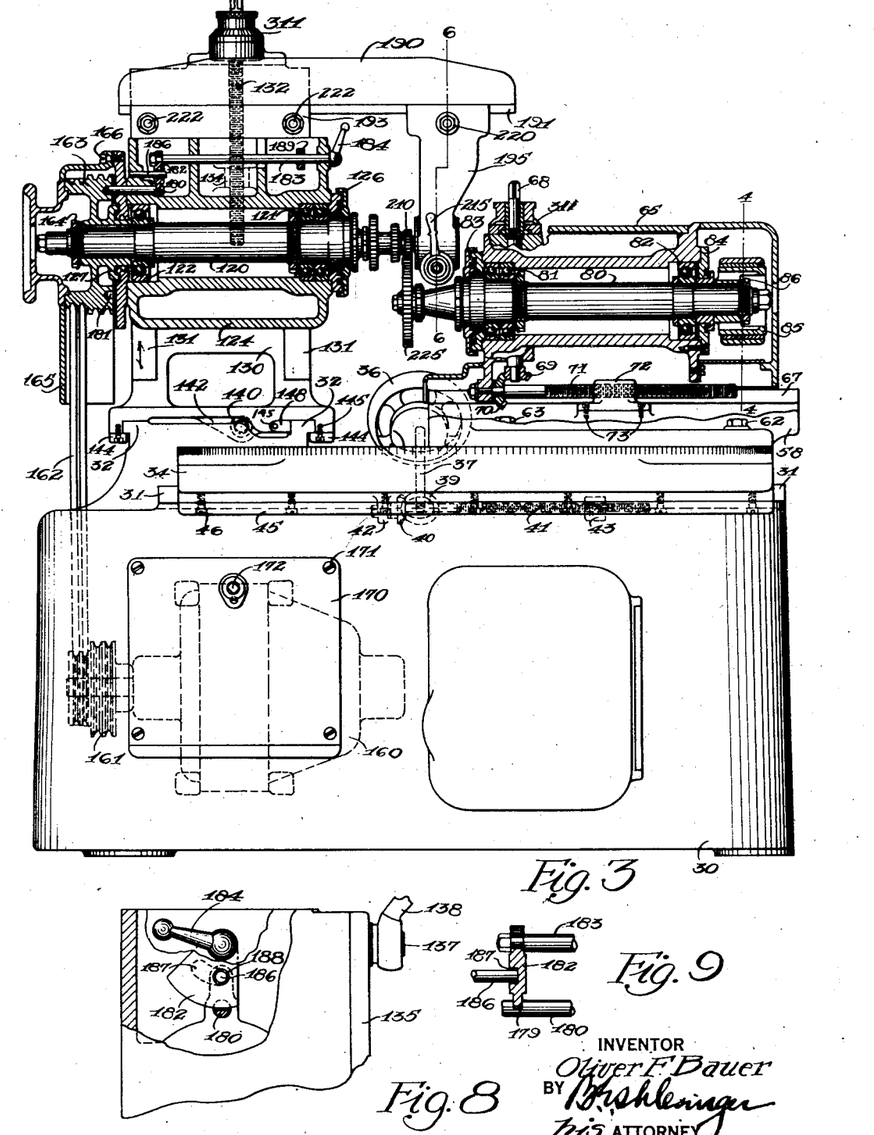
Figure 3 is a side elevation of the machine, showing it arranged for testing a pair of spur gears and showing both the drive and driven heads in section.
Figure 8 is a fragmentary view showing a detail of the mechanism for releasing the drive pulley or locking the same.
Figure 9 is a fragmentary view further illustrative of the drive pulley locking means.
Figure 4:
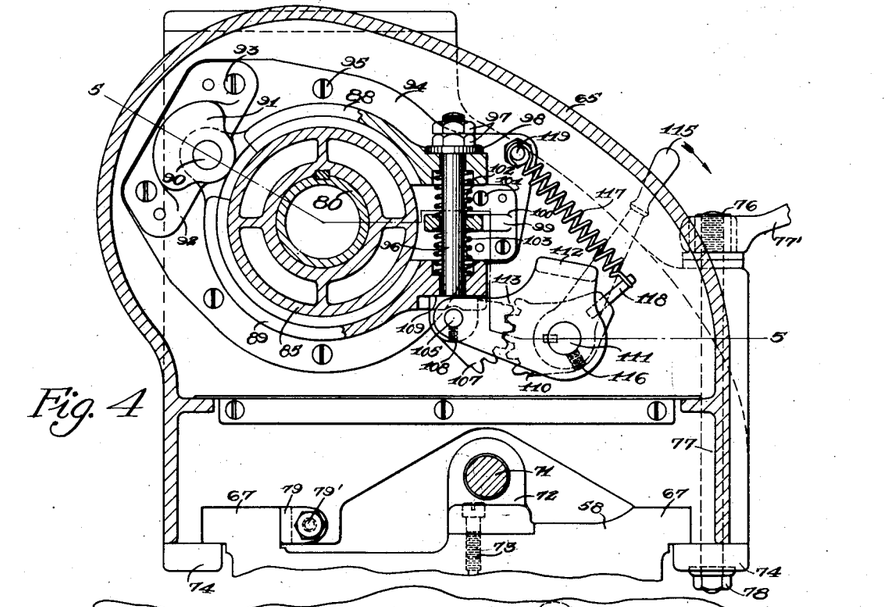
Figure 4 is a sectional view on an enlarged scale through the driven head of the machine, the view being taken on the line 4—4 of Figure 3.

In chucking or dechucking gears, it is necessary to hold the spindles 80 and 120 agains rotation. The spindle 80 can be held against rotation by braking the spindle through movement of the hand lever 115. The spindle 120 is held against rotation by forcing a pin 180 (Figs. 3, 8 and 9) into one of the spaced holes 181 that are provided in the front face of the pulley 163. The pin 180 has a kerf formed adjacent its inner end as indicated at 179 (Fig. 9). A plate 182 engages in this kerf. The plate 182 is secured to a sliding rock shaft 183 that is journaled in the drive head 124 and is manipulated by a hand-lever 184 which is secured to the shaft exteriorly of the head. The plate 182 has a shallow arcuate groove 187 formed in its rear face and there is an opening 188 drilled through the plate at the end of the groove. The diameter of this opening 188 is larger than that of the pin 186 so that the pin can pass through the opening when the plate is swung to align the pin with the opening. When the opening has been aligned with the pin 186, the operator can push the plate 182 rearwardly, thereby pushing the pin 180 into an opening 181 of the pulley 163. To withdraw the pin 180, the operation is reversed. The weight of the lever 184 tends to swing the plate 182 to the withdrawn position so that a positive operation is required to lock the pulley and thereby the danger of accidentally throwing the pin 180 in while the machine is running is avoided. To limit the sliding movement of the shaft 183 a stop is provided. This is designated at 189 and is secured by a set-screw to the shaft.

Figures 5, 6, 7:
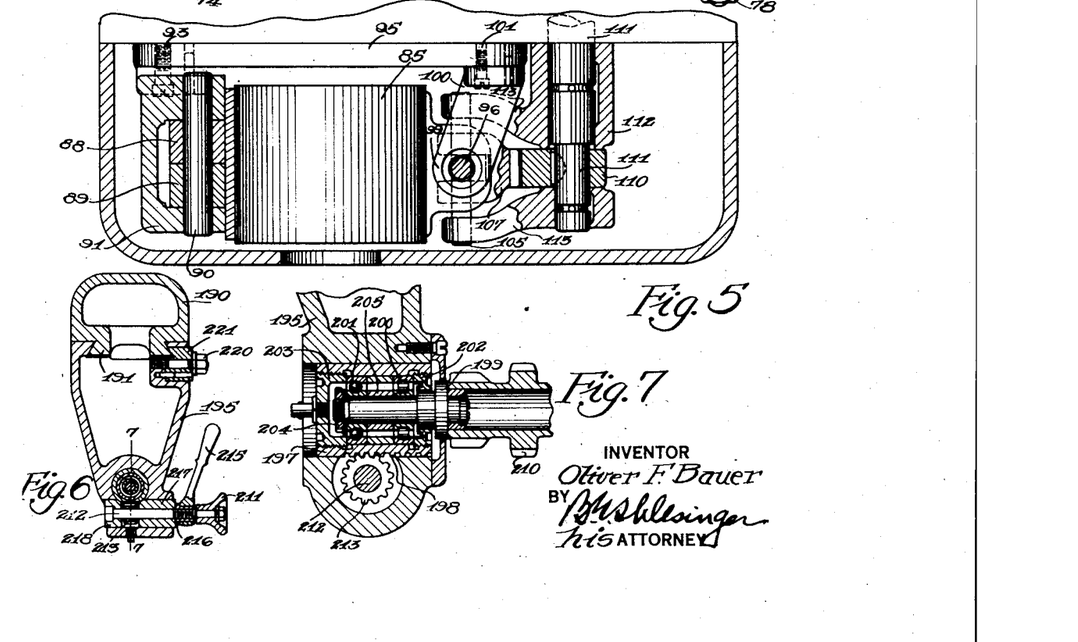
Figure 5 is a section on the line 5—5 of Figure 4, the brake drum being shown in elevation.
Figure 6 is a sectional view of the outboard support and center which may be used with the drive head for supporting long shank pinions or cluster gears when they are to be tested, the section being taken on the line 6—6 of Figure 3.
Figure 7 is a sectional view on an enlarged scale of the center, showing the same supporting a cluster gear, the section being taken on the line 7—7 of Figure 6.

In order to test long shank gears, cluster gears and other gears, which have to be chucked a considerable distance away from the nose of the drive spindle, an outboard support is provided. This outboard support includes an overarm 190 (Figs. 3 and 6) which is formed with a dove-tailed guide portion 191 that engages in the correspondingly shaped guide-way 192 (Figs. 1 and 2) of a plate 193 which is secured by screws 194 to the upper face of the drive head 124. The overarm 190 carries a tail-stock or arm 195 (Figs. 3, 6 and 7). This tail-stock 195 is provided with ways that slide on the dove-tailed guide portion 191 of the overarm. The tail-stock 195 is bored at its lower end to receive a sleeve 197 that is formed on one side with rack teeth 198. There is a center 199 mounted on anti-friction bearings 200 and 201 in the sleeve 197. The center 199 is held against movement in the sleeve by nuts 202 and 203. The bearings 200 and 201 are held in position by a nut 204 and are spaced apart by a spacer sleeve 205. The front end of the center is shaped to engage the gear which is to be mounted on the drive spindle 120. In the drawings the center 199 is shown as shaped to enter the bore of a cluster gear 210 but it will be obvious that it may be of any suitable construction to conform to the requirements of the job.

The center 199 may be adjusted axially in the tail stock 195 by rotation of the knob 211 (Fig. 6). This knob is secured to a shaft 212 which carries a spur pinion 213 that meshes with the rack 198 which is cut into the periphery of the sleeve 197. The center is secured in any adjusted position in the arm 195 by rotating the hand lever 215 to thread the nut 216 up on the shaft 212. There are two clamping blocks 217 and 218 mounted on the shaft 212 and when the nut 216 is threaded up on the shaft 212, these two clamping blocks 217 and 218 are forced toward each other to engage the periphery of the sleeve 197 and clamp the sleeve and with it the center 199 against movement in a direction axial of the center.

The center can also be adjusted in the direction of its axis by movement of its arm 195 on the overarm 190. When this latter adjustment has been made, the arm 195 can be clamped in adjusted position on the overarm by threading up on the bolt 220 to force the clamping block 221 into clamping engagement with one side of the guide-portion 191 of the overarm.

There is still a further means for adjusting the center 199 in the direction of its axis and that is by adjustment of the overarm 190 on the drive head 124. The overarm is secured in position after adjustment by bolts 222 (Fig. 3) which engage a clamping bar similar in construction to the clamping block 221.

Figure 13:
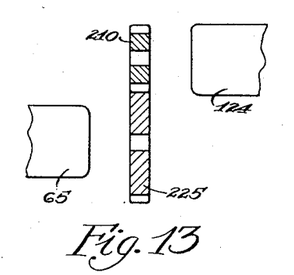
Figure 13 shows diagrammatically the set-up for testing a pair of spur gears.

The present machine can be used to test gears of all kinds and of a wide variety of sizes. For instance, to test a pair of spur gears 210, 225 such as shown in Figures 3 and 13 of the drawings, the swinging base 58 is adjusted angularly on the slide 34 until the axis of the driven spindle 80 is parallel to the axis of the drive spindle 120. The operator simply shoves the swinging base around for this adjustment. Then either the slide 34 may be adjusted on the frame 30 or the head 65 on the swinging base 58 to bring the spur gears 210 and 225 into correct axial position. Adjustment of the head 124 will then bring the two gears into mesh. The column 130 may be held fixed on the base and the head 124 simply adjusted on the column in order to mesh the gears or both the head 124 and the column 130 may be adjusted to secure the mesh. In the former case, the axes of the two spindles 80 and 120 will lie in the same vertical plane. In the latter case, these two axes will lie in some plane inclined to both the vertical and the horizontal. It will be seen that due to the fact that the column 130 may be adjusted on the frame and the head 124 on the column, spur gears up to very large diameters can be tested.

Helical and herringbone gears which run on parallel shafts will be adjusted into meshing engagement in the same manner as spur gears.

Figure 14:
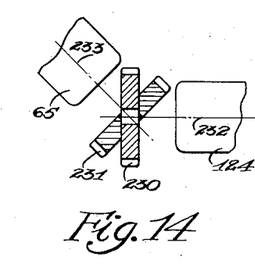
Figure 14 shows the set-up for testing a pair of helical gears.

Figure 14 illustrates diagrammatically how the machine may be arranged to test a pair of angular helical or so-called spiral gears 230 and 231. The gear 230 is mounted on the drive head 124 and the gear 231 on the driven head 65. The swinging base 58 is adjusted angularly on the slide 34 until the axes 232 and 233 of the two gears are at the correct angle to one another and then the other adjustments are made, as before, to bring the gears into mesh.

Figure 16:
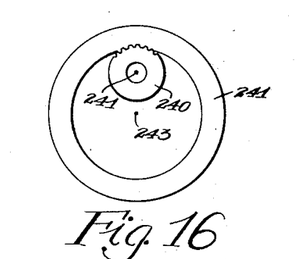
Figure 16 the set-up for testing a pair of internal gears.

To test a pair of internal gears such as shown at 240 and 241 in Figure 16, the swinging base 58 is adjusted on the slide 34 until the axis of the driven spindle is parallel to the axis of the drive spindle as is the case when testing spur gears. Then either the slide 34 can be adjusted on the frame 30 or the driven head 65 on the swinging base 58 to bring the gears into the correct axial position, the pinion 240 in the meantime having been preferably secured to the drive spindle and the gear 241 to the driven spindle. The axis 242 of the pinion can be offset the correct distance from the axis 243 of the gear by adjusting the head 124 on the column 130 or by adjusting the column 130 on the frame 30 or by combining these two adjustments as already described with reference to spur gears.

Figure 19:
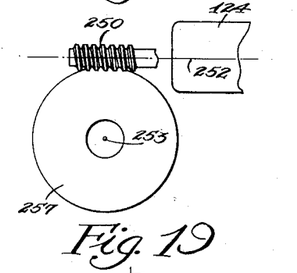
Figure 19 shows the set-up for testing a worm and worm wheel pair.

To test a worm and worm wheel pair such as shown in Figure 19, the worm 250 is mounted on the drive head 124 and the worm wheel 251 on the driven head 65. The swinging base 58 is adjusted angularly on the slide 34 until the axis of the driven spindle is at right angles to the axis of the drive spindle. Then the slide 34 is adjusted on the frame 30 and either the head 65 adjusted on the swinging base 58 or the column 130 adjusted on the frame 30 to bring the gears into correct relation. Preferably the column 130 remains in a fixed position of adjustment as far as possible and the other adjustment is employed to bring the gears into correct relation. The offset of the axis 252 of the worm and the axis 253 of the wormwheel is obtained by vertical adjustment of the drive head 124 on the column 130.

Figure 21:
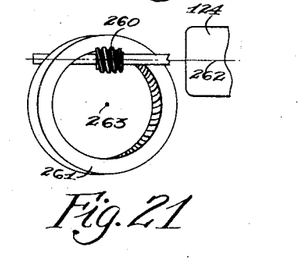
Figure 21 the set-up for testing an internal worm and worm wheel pair.

To engage the internal worm and wormwheel pair such as shown in Figure 21, the same adjustments are employed which have already been described with reference to adjustment of the pair shown in Figure 19 except that here the swinging base 58 must be adjusted on the slide 34 in accordance with the angle of inclination of the axis 262 of the worm 260 to the axis 263 of the internal wormwheel 261.

Figures 1, 12:
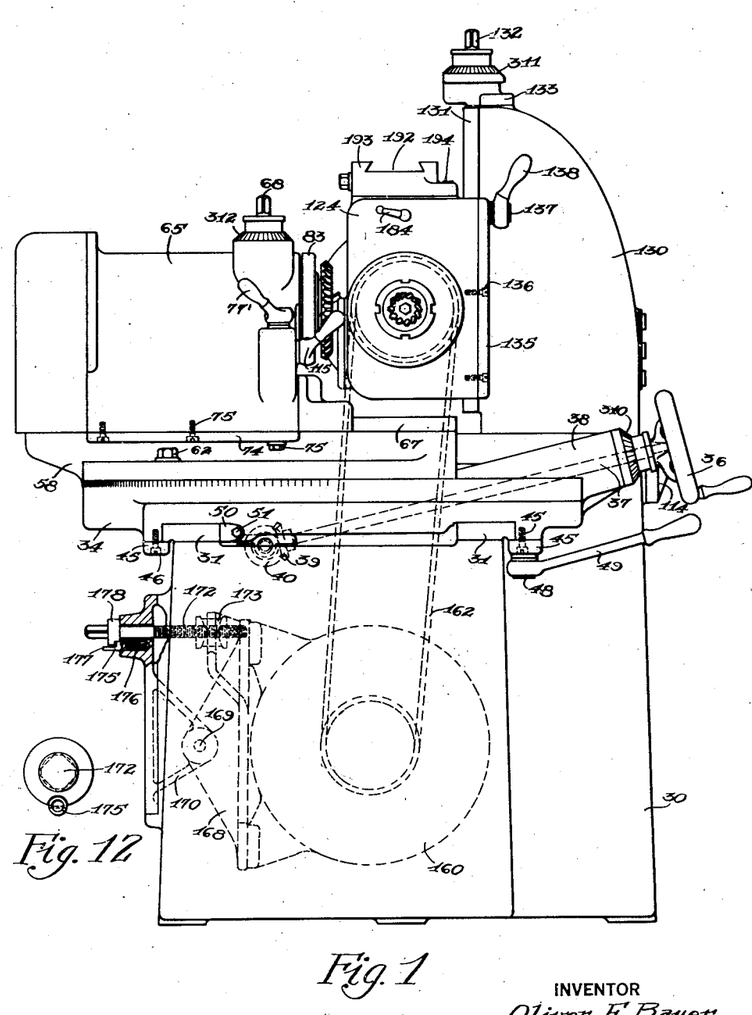
Figures 1 and 2 are, respectively, an end elevation and a plan view of a testing machine built according to a preferred embodiment of this invention, showing the machine arranged for testing a pair of spiral bevel gears.
Figure 12 is a detail view showing how the screw which is used to adjust the motor base is locked in any adjusted position.
Figure 15:
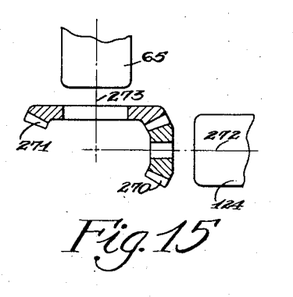
Figure 15 the set-up for testing a pair of right angular bevel or hypoid gears, either straight or spiral.

To test a pair of right angular bevel gears such as shown in Figures 1, 2 and 15, the swinging base 58 is adjusted on the slide 34 until the axis of the driven spindle is at right angles to the axis of the drive spindle and the drive head 124 must be adjusted on the column 130 so that the axes 272 and 273 of the two gears 270 and 271 lie in the same horizontal plane. The gears can be brought into engagement by adjusting the slide 34 on the frame 30 and the head 65 on the swinging base 58.

Figure 17:
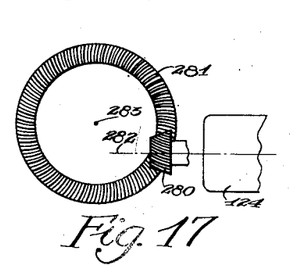
Figure 17 the set-up for testing a pair of hypoid gears, this view being at right angle to the views of Figures 15, 18 and 20.

To test a pair of right angular hypoid gears such as shown in Figure 17, the swinging base 58 is adjusted on the slide 34 until the axis of the driven spindle is at right angles to the axis of the drive spindle and then the drive head 124 is adjusted on the column 130 until the axis 282 of the pinion 280 is offset the correct distance from the axis 283 of the gear 281. The pinion is secured to the drive spindle and the gear to the driven spindle. The gears can be brought into mesh by adjusting the slide 34 on the frame 30 and the head 65 on the swinging base 58.

Figure 18:
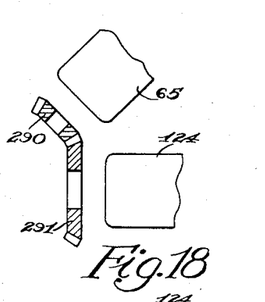
Figures 18 and 20 show two different set-ups for testing angular bevel or hypoid gears.
Figure 20:
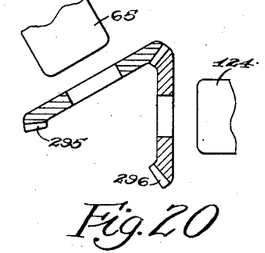

To test a pair of angular bevel gears such as the gears 290 and 291 shown in Figure 18 or the gears 295 and 296 shown in Figure 20, the swinging base 58 is adjusted angularly on the slide 34 until the axis of the driven spindle is at the correct angle to the axis of the drive spindle corresponding to the angle between the axes of the gears themselves. The other adjustments are made as before to bring the gears into meshing relation. If the gears are bevel, the axis of the driven spindle will lie in the same horizontal plane as the axis of the drive spindle and the head 124 will be adjusted on the column 130 accordingly. If the gears are angular hypoids, the head 124 will be adjusted on the column 130 to correspond to the offset between the axes of the two gears of the pair being tested.

In testing bevel or hypoid gears of normal cone distances, the column 130 is held fixed in the zero position of its adjustment and the adjustments necessary to bring the gears into mesh are made by adjusting the slide 34, swinging base 58, head 65 and head 124. These adjustments will cover any ordinary job. The maximum cone distance obtainable with these adjustments is determined by the maximum distance of adjustment of the slide 34 on the frame 30 and the maximum adjustment of the head 65 on the swinging base 58. The sliding adjustment of the column 130 in conjunction with the angular adjustment of the swinging base 58 and the slide 34 permits, however, of testing bevel or hypoid gears which have a cone distance far beyond the normal cone distance capacity of the machine, and far beyond the cone distance capacity of any standard bevel gear testing machine of the same size. This is one of the marked advantages of a machine constructed according to the present invention.

Figure 22:
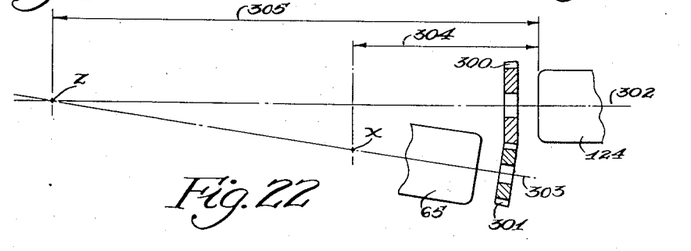
Figure 22 the set-up for testing a pair of bevel or hypoid gears of extremely long cone distance.

A pair of bevel gears 300 and 301 are shown in Figure 22. These gears have their cone centers at Z, their axes 302 and 303 intersecting in this point Z. The normal maximum cone distance adjustment of the machine is the distance 304 which is equal to the maximum distance between the center X and the nose of the drive spindle when the slide 34 and head 65 are in their full withdrawn positions. This distance 304 is much less than the cone distance 305 of the gears 300 and 301 to be tested. To test these gears, the gear 300 is mounted on the drive head 124, being chucked in the usual manner with its front cone surface outward, but the gear 301 is chucked backwardly on the driven spindle 65, that is with its back cone surface outward. Then the swinging base 58 is adjusted angularly on the slide 34 until the axis of the driven spindle is at an angle to the axis of the drive spindle corresponding to the angle between the axes 302 and 303 of the gears. Then, instead of adjusting the driven head 65 on the swinging base 58 outwardly, which is the practice with bevel gears of ordinary cone distance, the head 65 is adjusted inwardly on the swinging base 58 to carry the gear 301 inwardly, that is, toward the handwheel 36 (Fig. 2) beyond the center X of the swinging base 58. Now, normally when testing a pair of bevel gears, the axes of the drive and driven spindles will be adjusted so that they intersect in the center X but with the pair of gears 300 and 301, the axes of the drive and driven spindles must intersect in some point Z which lies beyond the point X. To secure this theoretical point of intersection of the axes of the gears 300 and 301, the column 130 must now be adjusted sidewise on the frame 30 until the axis of the drive spindle carried thereby will intersect the axis of the driven spindle carried by the head 65 in the point Z which is at the desired cone distance from the point of mesh of the two gears 300 and 301 being tested. So by means of the angular adjustment of the driven head on the base 34 and the sliding adjustment of the column 130 on the frame 30, the pair 300 and 301 can be tested. A comparatively small machine will do the work which could only be done heretofore on a machine of enormous size.

A pair of hypoids of extremely long cone distance can be tested in the same manner as the bevels by making the same adjustments as described for the bevels 300 and 301 of Figure 22 and in addition offsetting the axis of the drive spindle from the axis of the driven spindle by adjusting the drive head 124 vertically on the column 130 to the requisite offset distance.

To facilitate making the various adjustments, graduated dials 310, 311 and 312 may be secured to the shaft 37, 132, and 68, respectively, (Fig. 2) and the peripheral surface of the slide 34 may be graduated as shown in Figure 3. As the column 130 is normally fixed, it is not necessary to provide a graduated dial for the shaft 140 but a plug gage may be employed to adjust the column accurately where gears of the type shown in Figure 22 are to be tested.

The T-slots 55 and 56 in the slide 34 need only extend through an angle of 90° in order to test all jobs, but for convenience, I have made them extend through 135° as this eliminates to a large extent the chucking of one member backward. Any pair which, if chucked face forward, would require that the axes of the driven and drive spindles be at a greater angle than 135° to each other can be tested by chucking one member of the pair backward in the fashion shown in Figure 22.

In testing the gears of any pair, after they have been brought into mesh, they are rotated together, the pinion being usually the driver, the pinion spindle 120 being driven from the motor 160 through the pulley 161, belts 162 and pulley 163 and the pinion in turn driving the gear. The gears can be tested in their correct running position to determine the accuracy of the cutting machine while by means of the various adjustments of which the present testing machine is capable, the gears can be moved in and out and above and below correct running position to determine their adjustability. They can be tested under load for quietness by manipulating the lever 150 to apply a brake-load on the driven spindle 80 while they are being run together.

While a particular embodiment of the invention has been described, it will be understood that various modifications of the invention are possible within its scope. This application is intended to cover any adaptations, uses, or embodiments of the present invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. In a machine of the class described, a frame, a pair of heads, a spindle journaled in each head, said heads being mounted on the frame for relative adjustment in two directions at right angles and one of said heads being further adjustable on the frame angularly about an axis intersecting the axis of the spindle journaled therein, means for detachably securing a gear to each spindle, means for rotating one of the spindles to rotate the two gears in mesh by their intermeshing engagement, and means for applying a brake-load to one of said spindles.

2. In a machine of the class described, a frame, a pair of heads, a spindle journaled in each head, said heads being mounted on the frame for relative adjustment in two directions at right angles and one of the heads being further adjustable on the frame angularly through an angle of at least 90° about an axis intersecting the axis of the spindle journaled therein, means for detachably securing a gear to each of the spindles, means for rotating one of the spindles to rotate the two gears in mesh by their intermeshing engagement, and means for applying a brake-load to one of said spindles.

3. In a machine of the class described, a frame, a pair of heads, a spindle journaled in each head, said heads being mounted on the frame for relative adjustment in three directions respectively at right angles to one another and one of the heads being further adjustable on the frame angularly through an angle of at least 90° about an axis intersecting the axis of the spindle journaled therein, means for detachably securing a gear to each of the spindles and means for rotating one of the spindles to rotate the gears in mesh.

4. In a machine of the class described, a frame, a pair of heads, a spindle journaled in each head, a slide mounted for linear adjustment on the frame, one of the heads being mounted on the slide for angular adjustment about an axis intersecting the axis of the spindle journaled in said head and the other head being adjustable on the frame in a linear direction at right angles to the direction of adjustment of the slide, means for detachably securing a gear to each spindle, and means for rotating one of said spindles to rotate the gears in mesh.

5. In a machine of the class described, a frame, a pair of heads, a spindle journaled in each head, a slide mounted for linear adjustment on the frame, one of the heads being mounted on the slide for angular adjustment through an angle of at least 90° about an axis intersecting the axis of the spindle journaled in said head and the other head being adjustable on the frame in a linear direction at right angles to the direction of adjustment of the slide, means for detachably securing a gear to each spindle, and means for rotating one of the spindles to rotate the gears in mesh.

6. In a machine of the class described, a frame, a pair of heads, a spindle journaled in each head, a base on which one of the heads is mounted for adjustment in the direction of the axis of the spindle journaled in said head, a slide on which the base is adjustable angularly about an axis intersecting the axis of said spindle, said slide, in turn, being mounted for linear adjustment on the frame, means for detachably securing a gear to each of said spindles, and means for rotating one of said spindles to rotate the gears in mesh.

7. In a machine of the class described, a frame, a pair of heads, a spindle journaled in each head, a base on which one of the heads is mounted for adjustment in the direction of the axis of the spindle journaled in said head, a slide on which the base is adjustable angularly through an agle of at least 90° about an axis intersecting the axis of said spindle, said slide, in turn, being mounted for linear adjustment on the frame, means for detachably securing a gear to each of said spindles, and means for rotating one of said spindles to rotate the gears in mesh.

8. In a machine of the class described, a frame, a slide mounted on the frame for linear adjustment thereon, a base adjustable angularly on the slide, a head slidably adjustable on the base in either direction beyond the center about which the base adjusts, a spindle journaled in the head, a second head mounted on the frame, a spindle journaled in the second head, means for detachably securing a gear to each of said spindles, and means for rotating one of said spindles to rotate the gears in mesh.

9. In a machine of the class described, a frame, a slide mounted on the frame for linear adjustment thereon, a base adjustable angularly on the slide through an angle of at least 90°, a head slidably adjustable on the base in either direction beyond the center about which the base adjusts, a spindle journaled in the head with its axis intersecting the axis about which the base adjusts, a second head mounted on the frame, a spindle journaled in the second head, means for detachably securing a gear to each of said spindles, and means for rotating one of the spindles to rotate the gears in mesh.

10. In a machine of the class described, a frame, a slide mounted on the frame for linear adjustment thereon, a base adjustable angularly on the slide, a head slidably adjustable on the base in either direction beyond the axis about which the base adjusts, a spindle journaled in the head, a second head mounted on the frame, a spindle journaled in the second head, said second head being adjustable on the frame in a direction at right angles to the direction of adjustment of the slide, means for detachably securing a gear to each of said spindles, and means for rotating one of said spindles to rotate said gears in mesh.

11. In a machine of the class described, a frame, a slide mounted on the frame for linear adjustment thereon, a base adjustable angularly on the slide, a head slidably adjustable on the base in either direction beyond the axis about which the base adjusts, a spindle journaled in the head with its axis intersecting the axis about which the base adjusts, a second head mounted on the frame, a spindle journaled in the second head, said second head being adjustable on the frame in a direction at right angles to the direction of adjustment of the slide, means for detachably securing a gear to each of said spindles, and means for rotating one of said spindles to rotate the gears in mesh.

12. In a machine of the class described, a frame, a slide mounted on the frame for linear adjustment thereon, a base adjustable angularly on the slide, a head, a spindle journaled in the head with its axis intersecting the axis about which the base is adjustable, said head being adjustable on the base in the direction of the axis of the spindle journaled therein, a second head mounted on the frame, a spindle journaled in the second head, said second head being adjustable in a direction at right angles to the axis of the spindle journaled therein, means for detachably securing a gear to each of said spindles, and means for rotating one of said spindles to rotate the gears in mesh.

13. In a machine of the class described, a frame, a pair of spindles, said spindles being relatively adjustable on the frame in directions parallel to and at right angles to the axis of one of the spindles, one of the spindles being further adjustable angularly about an axis intersecting its own axis, and said spindles being further adjustable relatively in the direction of the axis of the angularly adjustable spindle, means for detachably securing a gear to each of said spindles, and means for rotating one of the spindles to rotate the gears in mesh.

14. In a machine of the class described, a frame, a pair of spindles, said spindles being relatively adjustable on the frame in directions parallel to and at right angles to the axis of one of the spindles, one of the spindles being further adjustable angularly through an angle of at least 90° about an axis intersecting its own axis, and said spindles being further adjustable relatively in the direction of the axis of the angularly adjustable spindle, means for detachably securing a gear to each of said spindles, and means for rotating one of the spindles to rotate the gears in mesh.

15. In a machine of the class described, a frame, a slide mounted on the frame for linear adjustment thereon, a base adjustable angularly on the slide, a head, a spindle journaled in said head with its axis intersecting the axis about which the base is adjustable, said head being adjustable on the base in the direction of the axis of its spindle, a second head mounted on the frame, a spindle journaled in the second head, said second head being adjustable in a direction at right angles to the axis of its spindle, and being further adjustable in a direction at right angles to the latter adjustment, said second spindle being journaled in its head so that in the zero position of the latter adjustment, its axis intersects the axis of the first spindle whereby through the latter adjustment its axis may be offset from the axis of the first spindle.

16. In a machine of the class described, a frame, a slide mounted on the frame for linear adjustment in a horizontal plane, a base mounted on the slide for angular adjustment in a horizontal plane, a head slidable on the base for linear adjustment in a horizontal plane, a column mounted on the frame for linear adjustment in a horizontal plane in a direction at right angles to the direction of adjustment of the slide, a head mounted on the column for vertical adjustment thereon, a spindle journaled in each head, means for detachably securing a gear to each of said spindles, means for rotating one of said spindles to rotate the gears in mesh, and means for applying a brake-load to said spindles while they are rotated.

17. In a machine of the class described, a frame, a slide mounted on the frame for linear adjustment thereon, a base, a sleeve, said base being formed with a cylindrical opening in which said sleeve is secured and said slide being formed with a cylindrical opening in which said sleeve engages to form a trunnion bearing about the axis of which the base is adjustable angularly on the slide, the periphery of that portion of the sleeve which is engaged in the opening of the base being eccentric of that portion of the periphery of the sleeve which engages in the opening in the slide, a head mounted on the base, a spindle journaled in the head with its axis intersectiong the axis of the trunnion bearing, said head being adjustable on the base in the direction of the axis of its spindle, a second head mounted on the frame, a spindle journaled in the second head, means for detachably securing a gear to each of said spindles, and means for rotating one of said spindles to rotate the gears in mesh.

18. In a machine of the class described, a frame, a slide mounted on the frame for linear adjustment thereon, a base, a sleeve, said base being formed with a cylindrical opening in which said sleeve is secured and said slide being formed with a cylindrical opening in which the sleeve engages to form a trunnion bearing about the axis of which the base is adjustable angularly on the slide through an angle of at least 90°, the periphery of that portion of the sleeve which is engaged in the opening of the base being eccentric of that portion of the periphery of the sleeve which engages in the opening in the slide, a head mounted on the base, a spindle journaled in the head with its axis intersecting the axis of the trunnion bearing, said head being adjustable on the base in the direction of the axis of its spindle, a second head mounted on the frame, a spindle journaled in the second head, means for adjusting the second head in a direction at right angles to the direction of adjustment of the slide, means for detachably securing a gear to each of said spindles, and means for rotating one of said spindles to rotate the gears in mesh.

19. In a machine of the class described, a frame, a pair of heads, a spindle journaled in each head, said heads being mounted on the frame so as to be adjustable relative to one another in a given plane transversely and axially of the spindle journaled in one head and being angularly adjustable relative to one another, also, in the same plane, and being further adjustable relative to one another radially of the axis about which they adjust angularly, means for detachably securing a gear to each spindle, and means for rotating one of said spindles to rotate the gears in mesh.

20. In a machine of the class described, a frame, a pair of heads mounted on the frame and adjustable thereon relative to one another so as to have together three rectilinear adjustments and one angular adjustment, two of the rectilinear adjustments being at right angles to one another, a spindle journaled in each head, means for detachably securing a gear to each spindle, and means for rotating one of said spindles to rotate the gears in mesh,

OLIVER F. BAUER.